Jan. 15, 1929.  F. A. STEVENS ET AL  1,699,080
OPHTHALMIC MOUNTING
Filed May 15, 1922
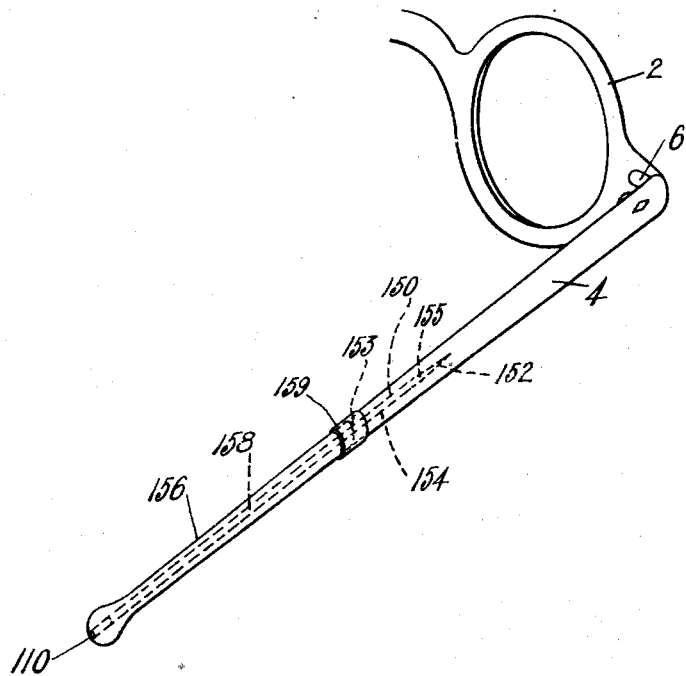
Inventors:-
Frederick A. Stevens.
James W. Welsh
David Rines
Attorney:-

Patented Jan. 15, 1929.

1,699,080

UNITED STATES PATENT OFFICE.

FREDERICK A. STEVENS AND JAMES W. WELSH, OF PROVIDENCE, RHODE ISLAND, ASSIGNORS, BY MESNE ASSIGNMENTS, TO BAUSCH AND LOMB OPTICAL COMPANY, OF ROCHESTER, NEW YORK, A CORPORATION OF NEW YORK.

OPHTHALMIC MOUNTING.

Application filed May 15, 1922. Serial No. 560,954.

The present invention relates to ophthalmic mountings or eyeglasses, and more particularly to spectacle temples.

The single figure of the accompanying drawings, is a view of a spectacle temple constructed according to an embodiment of the present invention, and shown hinged to a lens frame.

The temple 4 of the present invention is for the most part, constituted of plastic, non-metallic material, like celluloid, zylonite or other composition. Its outer surface tapers from its larger or forward end towards its rear end of smaller diameter and its sides are flattened. It is shown pivotally connected or secured at its forward or front end to a lens-holding, eyeglass frame 2 by a hinge 6. Spectacle or eyeglass temple bars of this type are in common use, but are comparatively heavy and clumsy, and rather thick at the rear ends to provide the necessary rigidity for holding the temple in place behind the ear. This is particularly true of skull temples, for the rear ends of skull temples are designed to engage, and hold firmly against, the skull, and this they can not do unless the non-metallic material is thick and of substantial proportions.

According to the present invention, however, the thickness of the rear end of the temple may be made small compared to that of the forward end, the required rigidity being attained by the use of a reinforcing or strengthening member 154, shown as a flexible metal wire or core. To this end, the main body portion 4 of the temple bar extends throughout a substantial length of the temple, and is longitudinally bored or recessed for a relatively short distance at 150 from the rear end towards the forward end. The longitudinal bore 150 is approximately of uniform dimension to start with, but the forward end 155 of the reinforcing rod 154 is sharp pointed, as shown. This sharp-pointed rod 154 is forced by pressure into the bore 150, becoming thus wedged or anchored or embedded into place, or interlocked with the walls of the bore or recess 150, and automatically rendering the forward portion 152 of the final bore 150 of reduced dimension. To facilitate this forcing or wedging process, the temple 4 is originally cut away at 153, so as to provide a comparatively small bore 150, permitting the rod 154 to be gripped very much closer to the end 155 of the rod while it is wedged into position. The rear portion of the rod 154 is thus caused to extend rearwardly from the rear end of the main body portion 4 in which it is secured. A comparatively long, non-metallic flexible tube 156 of comparatively small cross-dimension is then mounted over or about substantially the entire length of the rearward projecting portion 158 of the rod 154 to surround and cover it. The tube 156, if of suitable dimensions, may usually be maintained in position upon the portion 158 of the rod 154 without the aid of rivets, screws, or the like, though a metal collar 159 or equivalent means may be applied at the point 153, if desired, to help secure the parts together. The collar 159 is shown mounted over the adjacent abutting rear end of the member 4 and forward end of the tube 156. The free end of the bore of the tube 156 may be plugged with a non-metallic plug 110, effectually concealing the reenforcing rod. The plug 110 may be integrally secured to the tube 156, as by the use of a solvent, or in any other desired manner.

A temple constructed according to the present invention is very thin at the rear end. The reinforcing metal wire 154 conforms to the shape of the bore in the completed temple, and is adapted to be flexed with the thin, non-metallic tube 156. The temple may be bent or curved into any desired temple shape, such as the ear-hook or skull shape, so as to extend over the ear of the wearer.

Modifications may be made by persons skilled in the art within the spirit and scope of the invention, as defined in the appended claims.

What is claimed as new is:

1. A spectacle temple comprising a non-metallic member adapted to be hinged at the forward end and having a rearward projecting reinforcing metal member, and a non-metallic tube mounted over the rearward projecting metal member.

2. A spectacle temple comprising a non-metallic member bored at its rear end and adapted to be hinged at the forward end, a reinforcing metal member mounted in the bore and having a portion projecting rearward beyond the rear end of the non-metallic member, and a non-metallic member mounted over the projecting portion of the reinforcing member.

3. A spectacle temple comprising a non-metallic member of comparatively large cross-dimension bored at its rear end and adapted to be hinged at the forward end, a reinforcing metal member mounted in the bore and projecting rearward beyond the bore, and a non-metallic tube of comparatively small cross-dimension mounted over the rearward projecting portion of the reinforcing member.

4. In eyeglass construction, a temple bar having a main body portion of celluloid provided with a recess at one end thereof, a metallic extension having one end adapted to be received within said recess and formed to interlock with the walls thereof, and a non-metallic covering for said metallic extension, one end of said covering being secured to said main body portion.

5. In eyeglass construction, a temple bar having a main body portion of celluloid, means for securing said main body portion at one end thereof to an eyeglass frame, a metallic member extending rearwardly from the other end of said main body portion, and non-metallic means surrounding said metallic extension member.

6. In eyeglass construction, a temple bar having a main body portion of celluloid, a flexible metallic extension secured thereto and extending rearwardly thereof and non-metallic means about said metallic extension and adapted to be flexed therewith.

7. In eyeglass construction, a temple bar having a main body portion of celluloid provided with a recess extending into the rear end thereof and having means at the front end thereof for securing said main body portion to an eyeglass frame, a metallic extension for said celluloid body portion having one end adapted to be received within said recess, means for anchoring said metallic extension in said recess, and flexible non-metallic means about said metallic extension.

In testimony whereof, we have hereunto subscribed our names this 11th day of May, 1922.

FREDERICK A. STEVENS.
JAMES W. WELSH.